United States Patent [19]
Folomin et al.

[11] 4,090,597
[45] May 23, 1978

[54] FLUID AND TORQUE OPERATED FRICTION CLUTCH

[76] Inventors: Anatoly Alexandrovich Folomin, Dmitrovskoe shosse, 37, kv. 100; Vsevolod Karpovich Fesenko, Avtomotornaya ulitsa, 4, korpus 6, kv. 52; Konstantin Georgievich Evgrafov, ulitsa Usievicha, 25, korpus 1, kv. 8; Lev Mikhailovich Yakovlev, Balaklavsky prospekt, 40, kv. 23; Arnold Ivanovich Petrov, Dmitrovskoe shosse, 37, kv. 327, all of Moscow, U.S.S.R.

[21] Appl. No.: 762,340

[22] Filed: Jan. 25, 1977

[51] Int. Cl.² .................. F16D 25/00; F16D 43/20
[52] U.S. Cl. ............................. 192/85 AA; 192/86; 192/54; 192/56 F; 192/109 A; 192/109 D
[58] Field of Search ............ 192/85 AA, 86, 106 F, 192/109 A, 109 D, 54, 56 F

[56] References Cited

U.S. PATENT DOCUMENTS

| | | | |
|---|---|---|---|
| 2,702,619 | 2/1955 | Andershock | 192/85 AA |
| 2,860,713 | 11/1958 | Peterson | 192/106 F |
| 3,042,167 | 7/1962 | Petrie et al. | 192/86 |
| 3,360,087 | 12/1967 | Hilpert | 192/56 F |

Primary Examiner—Benjamin W. Wyche
Attorney, Agent, or Firm—Fleit & Jacobson

[57] ABSTRACT

A friction clutch for gas-turbine engine transmission gear has a casing which accommodates friction plates arranged between the back plate and pressure plate and an axially movable piston elastically coupled to the casing for pressing the friction plates when the engine operates in the traction mode by way of fluid under pressure fed to a variable-volume chamber defined by the casing and piston, and for pressing the friction plates when the engine operates in the braking mode from individual drive comprising a shaft of the gas-turbine engine transmission gear which is kinematically associated with the piston through a cam mechanism. Elastic coupling of the piston to the casing comprises an auxiliary variable-volume chamber in permanent communication with a fluid source via a throttle aperture, the auxiliary chamber being located opposite the variable-volume chamber between the casing and piston and defined by a cylinder mounted in the casing and another piston rigidly connected to the first piston. The clutch is simple in structure, reliable in operation and smoothly engageable.

5 Claims, 3 Drawing Figures

FLUID AND TORQUE OPERATED FRICTION CLUTCH

The invention relates to the manufacture of components for motor vehicles, and more specifically to friction clutches for gas-turbine engines.

There areknown friction clutches which are housed within the transmission gearbox of a gas-turbine engine and are comprised of a casing connected to a drive shaft. Friction plates are arranged in the casing between a back plae and a pressure plate. The plates having outer slots are connected to the casing, and the plates having inner slots are connected to the driven shaft by means of an intermediate member.

The casing also houses a spring-loaded piston which, together with the casing, defines two coaxial variable-volume chambers. Each chamber communicates with an independent source of pressurized fluid acts upon the piston for pressing the plates. The chamber located closer to the rotational axis has a smaller cross-sectional area and is used for moving the piston for pressing the friction plates when the engine opereates in the traction mode. The chamber remote from the rotational axis has a greater cross-sectional area and is used for pressing the friction plates when the engine operates in the braking mode.

When the engine operates in the braking mode, a considerable braking torque is to be transmitted; and for that purpose the friction plates should be pressed with a comparatively great force. In the above-described friction clutch it is required to have a fluid source of a comparatively high pressure for pressing the plates in the braking mode; moreover, an independent clutch control system is required to provide for timely automatic pressing of the friction plates with a desired force. The provision of a fluid source operating at comparatively high pressure and automatic control system for controlling clutch operation in the braking mode make the friction clutch rather complicated and lower its reliability in operation.

It is an object of the invention to provide a friction clutch for gas-turbine engine transmission gear in which independent drive means of the piston for pressing the friction plates when the engine operates in the braking mode have comparatively simple structure.

Another object of the invention is to provide comparatively high degree of reliability of the clutch in operation.

With the above and other objects in view, it is contemplated a friction clutch for gas-turbine engine transmission gear having a casing which accommodates friction plates arranged between the back plate and pressure plate, as well as an axially movable piston elastically coupled to the casing for pressing the friction plates under the action of pressurized fluid fed to a variable-volume chamber defined by the casing and piston, when the engine operates in the traction mode, and for pressing the friction plates under the action of independent drive means when the engine operates in the braking mode, wherein, according to the invention, said independent drive means comprise a shaft of the gas-turbine engine transmission gear which is in a force transmitting connection with the piston by means of a cam mechanism, and the elastic coupling of the piston and casing comprises an auxiliary variable-volume chamber communicating with a fluid source via a throttle aperture, the auxiliary chamber being located opposite to the variable-volume chamber and defined by a cylinder mounted in the casing and another piston rigidly connected to the first piston.

The first piston and the second piston are preferably of substantially the same diameter.

This allows for counterbalancing the fluid pressure force applied to the piston pressing the set of friction plates which is built-up in the fluid due to rotation thereof with the clutch.

At least one resilient member is preferably provided between the piston and the pressure plate for uniform transmission of the piston pressure to the plate, and the cylinder is preferably provided with a stop limiting the displacement of the piston which is fixed in such a manner that the piston stroke should be somewhat smaller than the amount of full deformation of the resilient member.

This construction prevents the clutch from transmitting braking torque in excess of the rated torque.

Each cam of the cam mechanism coupling the transmission gear shaft to the piston preferably has a helical surface for axial displacement of the piston for pressing the friction plates when the engine operates in the braking mode, and another flat surface at an angle to the helical surface which is used for transmitting torque when the engine operates in the traction mode.

This construction enables the displacement of the piston pressing the friction plates under the action of either fluid under pressure fed to the variable-volume chamber defined by the casing and piston or an independent drive.

At least one resilient member is provided between the pressure plate and the adjacent friction plate for permanently pressing the friction plates.

This construction improves the reliability of the clutch when the gas-turbine engine is switched over to the braking mode.

The friction clutch according to the invention is comparatively small in size, simple in structure and reliable in operation. In addition, the clutch according to the invention improves the degree of reliability of coupling of the engine turbine shafts and has simplified control system; it provides for smooth engagement and protects the engine against torque overload.

The invention will now be described in greater details with reference to the accompanying drawings, in which.

Figure 1:
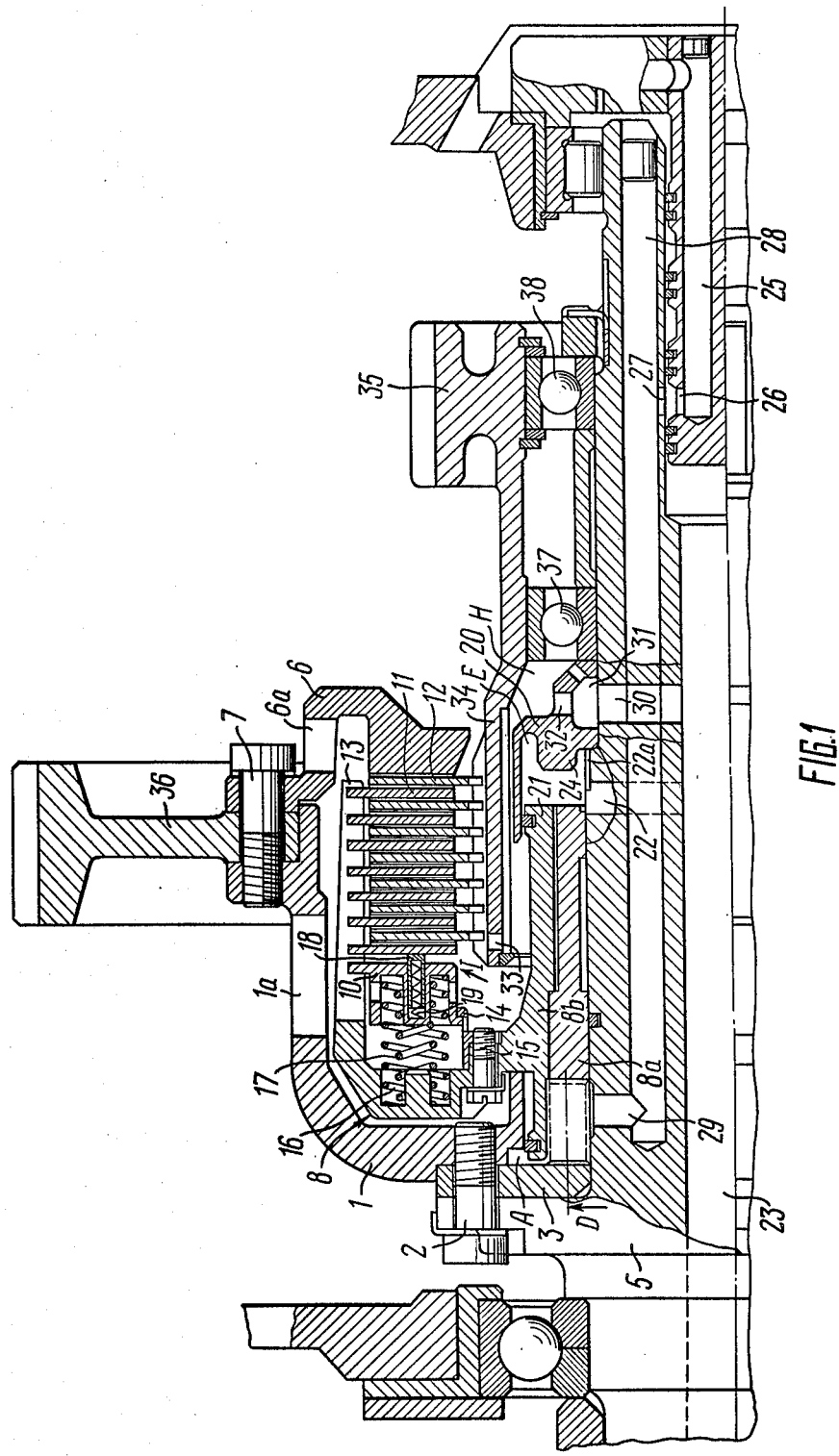
FIG. 1 shows a longitudinal section of the friction clutch for gas-turbine engine according to the invention taken along the axis of symmetry.
Figure 3:
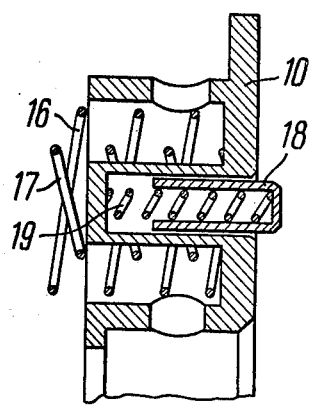
FIG. 3 is an enlarged detail ;I; of FIG. 1.
Figure 2:
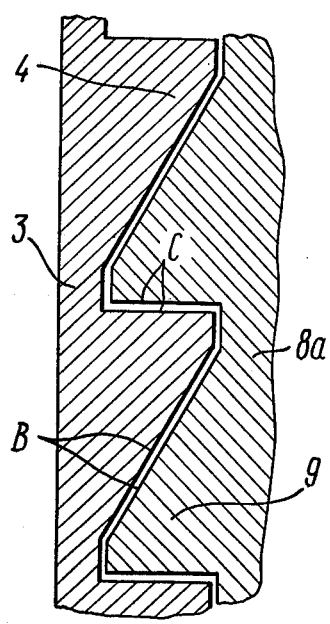
FIG. 2 is a developed view of cams taken at their intermediate diameter "D"

The friction clutch of a gas-turbine engine comprises a casing 1 (FIG. 1) having holes 1a. The casing 1 is secured by means of bolts 2 and a washer 3 having end cams 4 (FIG. 2), to an output shaft 5 (FIG. 1) of a transmission gear of the gas-turbine engine (not shown). The shaft 5 is in a force transmitting connection with the shafts of turbines of the gas-turbine engine (not shown). A back plate 6 is secured to the casing 1 by means of bolts 7. The back plate 6 has openings 6a. The casing 1 accommodates a piston 8 which consists of members 8a and 8b press fitted into each other. The member 8a has end cams 9 (FIG. 3). Friction plates 11 having outer slots and friction plates 12 having inner slots are arranged in the piston 8 (FIG. 1) between a pressure plate 10 and the back plate 6. The cams 4 and 9 from a cam mechanism for converting rotary motion of the shaft of one of the turbines which is in a force transmitting connection with the shaft 5 into axial displacement of the piston 8 for pressing the friction plates 11 and 12 when the gas-turbine engine operates in the braking mode.

The casing 1 and piston 8 define a variable-volume chamber "A" to be filled with fluid under pressure which is used for axially displacing the piston to press the friction plates 11 and 12 when the engine operates in the traction mode.

The piston 8 has grooves 13 receiving the projections between the slots of the pressure plate 10 and friction plates 11. The piston 8 is axially movable relative to the pressure Plate 10 and friction plates 11. The pressure plate 10 is connected to the piston 8 by means of a thrust ring 14 secured to the piston 8 by means of screws 15. Resilient members in the form of springs 16 and 17 are equally circumferentially spaced between the piston 8 and the pressure plate 10 for uniform transmission of the piston pressure to the pressure plate 10. Hollow pushers 18 internally provided with resilient members in the form of springs 19 are equally spaced between the pressure plate 10 and the friction plate 11.

The springs 19 permanently press the friction plates 11 and 12 with a small force, via the pushers 18.

Each of the cams 4 and 9 of the cam mechanism has a helical surface "B" which is used for axial displacement of the piston 8 for pressing the friction plates 11 and 12 when the gas-turbine engine operates in the braking mode, and another surface "C" which is flat and extends at an angle to the surface "B". The surface "C" is used for transmitting torque when the gas-turbine engine operates in the traction mode.

The surface "C" of each cam lies in a plane extending through the rotational axis of the clutch.

A cylinder 20 is fixed to the end of the output shaft 5 located within the casing 1 and receives another piston 21 rigidly connected to the piston 8. In this embodiment the piston 8 is integral with the piston 21. The cylinder 20 and the piston 21 define an auxiliary variable-volume chamber "E" which is located opposite to the variable-volume chamber "A" defined by the piston 8 and the casing 1. The chamber "E" communicates with a fluid source under very low gauge pressure, via throttle apertures 22 and a passage 23. In this embodiment, this source comprises the clutch lubrication and cooling system. The shaft 5 has a longitudinal groove 22a which is received with one end thereof in the aperture 22 so as to provide for permanent communication of the chamber "E" with the fluid source. The cylinder 20 is provided with a stop 24 of annular shape which limits the displacement of the piston 8. This stop is located in such a manner that the stroke of the piston 8 is somewhat smaller than the amount of full deformation of the springs 16 and 17.

Fluid under pressure is fed to the chamber "A" via passages 25, 26, 27, 28 and 29 from a hydraulic system for automatic control of the clutch.

Fluid is fed to the friction plates 11 and 12 from the clutch lubrication and cooling system (not shown) via passages 23, 30, 31, 32, space "H" and openings 33. The openings 33 are provided in a sleeve 34 supporting a gear 35 and having splines receiving the projections of the friction plates 12. The gear is in a force transmitting connection with the shaft of another turbine (compressor turbine) (not shown) of the gas-turbine engine. A gear 36 is fixed between the casing 1 and the back plate 6, and this gear is in a force transmitting connection with the shaft of one (traction) turbine (not shown) of the gas-turbine engine.

The gear 35 is journalled on the output shaft 5 by means of bearings 37 and 38.

The above-described friction clutch of the gas-turbine engine functions in the following manner.

When the gas-turbine engine operates in the traction mode, fluid under pressure is fed to the variable-volume chamber "A" (FIG. 1), via the passages 25, 26, 27, 28 and 29, from the automatic clutch control hydraulic system (not shown). Thus, the piston 8 presses the friction plates 11 and 12, via the springs 16 and 17 and the pressure plate 10. The value of torque transmitted by the clutch at that time depends on the fluid pressure in the chamber "A". The torque is transmitted from the gear 35 coupled to a turbo-compressor (not shown) of the engine through a series connection of the friction plates 12 and 11, piston 8, end cams 9 of the piston 8, cams 4 of the washer 3 and the washer 3 to the output shaft 5 of the transmission gear of the engine. In this case the cams 4,9 engage the flat surfaces "C". A part of the torque is transmitted from the gear 35 ot the back plate 6, via one of the friction surfaces of the friction plate 12, and then to the output shaft 5, via the casing 1.

When the gas-turbine engine operates in the braking mode, the torque is transmitted from the shaft 5 to the gear 35 in the reversed order. In this case the cams 4 of the washer 3 and the cams 9 of the piston 8 engage one another with their helical surfaces "B". Due to a pre-compression of the friction plates 11 and 12 with a small force by means of the springs 19, an axial force appears at the helical surfaces "B" under the action of the torque being transmitted to displace the piston 8 so that the latter engages the stop 24 of the cylinder 20. During the displacement, the piston 8 causes compression of the set of springs 16 and 17 to press the friction plates 11 and 12 via the springs, as well as via the pressure plate 10. The force pressing the plates depends on the degree of compression of the set of springs 16 and 17. This force determine, in turn, the value of torque which is transmitted by the friction plates 11 and 12. Maximum values of the compression force at the plates and of the torque are selected in such a manner as to protect the engine transmission gear parts against overload.

In order to provide for a good control of the clutch over the entire operating speed range by controlling working fluid pressure in the chamber "A" by means of an automatic hydraulic clutch control system, as well as to improve reliability of engagement and disengagement of the clutch when switching over from the traction mode to the braking mode, and vice versa, additional pressure built-up in the chamber "A" as a result of fluid rotation with the chamber and applied to the piston 8 and plates 11 and 12 is to be eliminated. This is achieved, in the clutch according to the invention, by the provision of the cylinder 20 which defines, with the piston 8, a chamber "E" filled with fluid. Fluid pressure applied to the piston 8 due to rotation of fluid together with the chamber "E" allows for counterbalancing the fluid pressure applied to the same piston on the part of the chamber "A" which is built-up rotation of fluid together with the chamber "A".

In order that the force pressing the friction plates 11, 12 increase amoothly when changing over to the braking mode, the piston 8 can only move at comparatively low speed. This is achieved due to the provision of the groove 22a of the shaft 5 which throttles the flow of fluid leaving the chamber "E" at that time.

The friction plates 11 and 12 of the clutch are cooled with fluid fed thereto from the hydraulic lubrication and cooling system of the clutch, via the passages 23, 30, 31 and 32, space "H" and the openings 33 (only one opening 33 is shown) of the sleeve 33 of the gear 34. The fluid is discharged from the clutch via the holes 1a and 6a of the casing 1 and back plate 6 of the clutch, respectively.

What is claimed is:

1. A friction clutch for gas-turbine engine transmission gear comprising: a casing; a back plate rigidly connected to said casing; a pressure plate mounted for axial movement in said casing in a spaced apart relationship to said back plate; frction plates mounted in said casing between said pressure plate and back plate; a piston mounted in said casing having one side adjacent to said pressure plate; a variable-volume chamber defined by said casing and piston communicating with a source of fluid under pressure to control the axial movement of said piston for pressing said friction plates when the gas-turbine engine operates in the traction mode; a cam mechanism coupling said piston to the shaft of the gas-turbine engine transmission gear for axial displacement of said piston for pressing said friction plates when the gas-turbine engine operates in the braking mode; a cylinder mounted in said casing; a second piston mounted in said cylinder and rigidly connected to said first piston; and auxiliary variable-volume chamber defined by said cylinder and said second piston, the auxiliary chamber being located opposite to said variable-volume chamber defined by said casing and first piston, and communicating, via a throttle aperture, with a fluid source, whereby additional pressure application to said piston and friction plates resulting from rotation of fluid together with said chamber is eliminated.

2. A friction clutch according to claim 1, wherein the first piston and the second piston are of substantially the same diameter.

3. A friction clutch according to claim 1, wherein at least one resilient member is provided between the piston and the pressure plate to uniformly transmit the piston pressure to the plate, and the cylinder is provided with a stop limiting the displacement of the piston, the stop being fixed in such a manner that the piston stroke is somewhat smaller than the amount of full deformation of the resilient member.

4. A friction clutch according to claim 1, wherein each cam of the cam mechanism coupling the transmission gear shaft to the piston has a helical surface for axial displacement of the piston for pressing the frction plates when the engine operates in the braking mode, and another surface at an angle to the helical surface which is flat and is used for transmission of torque when the engines operates in the traction mode.

5. A friction clutch according to claim 1, wherein at least one resilient member is provided between the pressure plate and the friction plate adjacent thereto to permanently press the friction plates.

* * * * *